United States Patent
Fagot-Revurat

(10) Patent No.: US 9,850,005 B2
(45) Date of Patent: Dec. 26, 2017

(54) METHOD AND DEVICE FOR COUNTING THE NUMBER OF LANDINGS PERFORMED BY AN AIRCRAFT TYRE

(75) Inventor: Lionel Fagot-Revurat, Clermont-Ferrand (FR)

(73) Assignees: COMPAGNIE GENERALE DES ETABLISSEMENTS MICHELIN, Clermont-Ferrand (FR); MICHELIN RECHERCHE ET TECHNIQUE S.A., Granges-Paccot (CH)

( * ) Notice: Subject to any disclaimer, the term of this patent is extended or adjusted under 35 U.S.C. 154(b) by 148 days.

(21) Appl. No.: 14/111,006

(22) PCT Filed: Apr. 12, 2012

(86) PCT No.: PCT/FR2012/050798
§ 371 (c)(1),
(2), (4) Date: Nov. 8, 2013

(87) PCT Pub. No.: WO2012/140370
PCT Pub. Date: Oct. 18, 2012

(65) Prior Publication Data
US 2014/0058621 A1    Feb. 27, 2014

(30) Foreign Application Priority Data
Apr. 13, 2011    (FR) .................... 11 01154

(51) Int. Cl.
*B64F 5/00*    (2017.01)
*G07C 5/08*    (2006.01)
(Continued)

(52) U.S. Cl.
CPC ........ *B64F 5/0045* (2013.01); *B60C 23/0477* (2013.01); *B64F 5/60* (2017.01); *G07C 5/085* (2013.01); *B64D 2045/008* (2013.01)

(58) Field of Classification Search
None
See application file for complete search history.

(56) References Cited

U.S. PATENT DOCUMENTS 5,965,808 A * 10/1999 Normann ............ B60C 23/0408
                                                         116/34 R
7,360,411 B2   4/2008 Beranger et al. ............... 73/146
(Continued)

FOREIGN PATENT DOCUMENTS

EP    1 892 129 A2    2/2008
EP    2 208 971 A1    7/2010
(Continued)

Primary Examiner — Todd Melton
Assistant Examiner — Jason Roberson
(74) Attorney, Agent, or Firm — Fitzpatrick, Cella, Harper & Scinto

(57) ABSTRACT

A number of landings of an aircraft tire is counted according to a method that includes: measuring a physical quantity of air contained inside the tire, the measuring taking place in a discontinuous mode; determining at least one indicator relating to the physical quantity; comparing the at least one indicator with a predetermined threshold associated with the tire; and, if the at least one indicator is greater than the predetermined threshold associated with the tire, incrementing the number of landings of the tire.

12 Claims, 2 Drawing Sheets

(51) Int. Cl.
*B60C 23/04* (2006.01)
*B64F 5/60* (2017.01)
*B64D 45/00* (2006.01)

(56) References Cited

U.S. PATENT DOCUMENTS

| | | | |
|---|---|---|---|
| 7,468,655 B2 | 12/2008 | Logan | 340/442 |
| 2004/0075022 A1 | 4/2004 | MacKness | 244/100 R |
| 2004/0243322 A1 | 12/2004 | Locatelli | 702/57 |
| 2005/0258949 A1* | 11/2005 | Iwazumi | B60C 23/0408 340/442 |
| 2006/0079190 A1* | 4/2006 | Ooba | B60C 23/0408 455/226.1 |
| 2007/0080795 A1* | 4/2007 | Ichikawa | B60C 23/0413 340/447 |
| 2008/0033607 A1 | 2/2008 | Zeliff et al. | 701/29 |
| 2012/0041639 A1* | 2/2012 | Followell | G01M 17/04 701/34.3 |

FOREIGN PATENT DOCUMENTS

| | | |
|---|---|---|
| FR | 2 937 728 A1 | 4/2010 |
| FR | 2 939 897 A3 | 6/2010 |
| JP | H03-014795 A | 1/1991 |
| JP | 2008-049999 A | 3/2006 |
| JP | 2008-022265 A | 1/2008 |
| JP | 2008-027178 A | 2/2008 |
| JP | 2008-505843 A | 2/2008 |
| WO | WO 2004/110793 A2 | 12/2004 |

\* cited by examiner

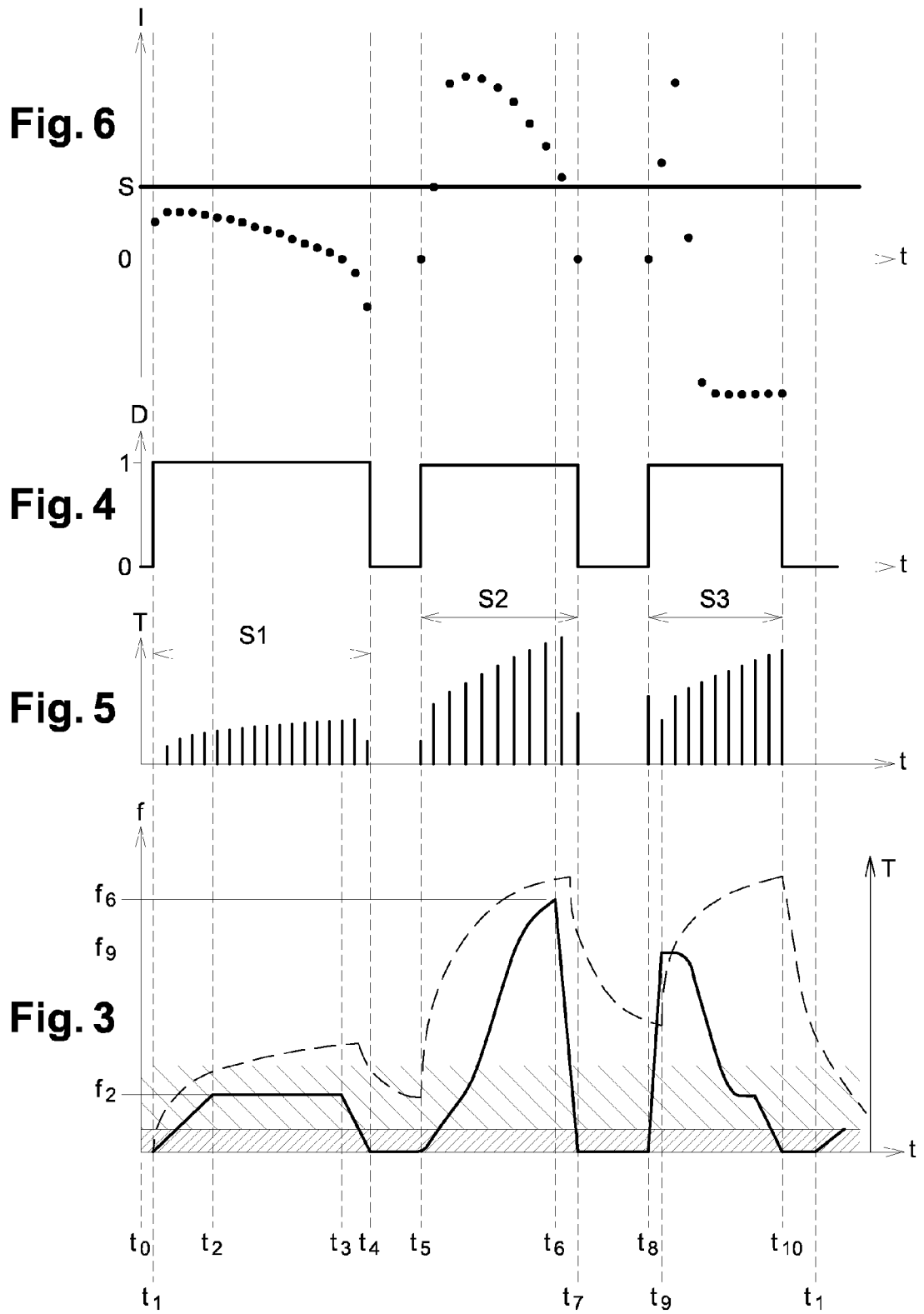

METHOD AND DEVICE FOR COUNTING THE NUMBER OF LANDINGS PERFORMED BY AN AIRCRAFT TYRE

FIELD OF THE INVENTION

The present invention relates to the field of landing gear tyres for aircraft.

BACKGROUND

The wear of a tyre of an aircraft depends on the number of landings and takeoffs to which it is subjected. The number of landings is equal to the number of takeoffs.

On the one hand, it is desirable for the manufacturer to know this number of landings or of takeoffs in order to monitor the wear of the tyres and to appreciate the variation in the performance of the tyres as a function of the wear of the latter. On the other hand, it is desirable for the various actors intervening on the aircraft (maintenance services, inspection services, etc.) to be able to anticipate the change or the retreading of a worn tyre.

From the document FR 2 939 897, a method and a device is known for counting the number of landings of a aircraft tyre. The device is attached to an internal surface of the tyre. The device comprises a sensor and means for powering the device, for example a battery. The sensor comprises a coil sensitive to the time variations in magnetic flux generated by the rotation of the tyre in the Earth's magnetic field or in a local magnetic field generated for example by a magnet. The coil then generates a periodic signal whose frequency is equal to the frequency of rotation of the tyre. During the method, the frequency of rotation of the tyre is measured. When the frequency of rotation exceeds a predetermined threshold, in other words during a landing or takeoff phase, the number of landings is incremented.

However, in order to measure the frequency of rotation of the wheel, the sensor continuously measures the signal generated by the coil, which is very energy-hungry. Thus, in view of its high energy consumption, the device has a lifetime limited to 2 years using a battery with a capacity of 550 mA·h and weighing 8 g. It is therefore necessary to change the power supply means at each retreading. In order to avoid a change of the power supply means at each retreading, the capacity of the power supply means can be increased which inevitably increases the weight. However, the increase in the weight results in too high a mass imbalance during the rotation of the tyre at high speed.

BRIEF DESCRIPTION OF EMBODIMENTS OF THE INVENTION

The aim of the invention is to provide a less energy-hungry counting device and a method.

For this purpose, one subject of the invention is a method for counting the number of landings of an aircraft tyre, characterized in that it comprises the following steps:
- a physical quantity of the air contained inside of the tyre is measured in discontinuous mode;
- at least one indicator relating to the physical quantity is determined;
- the indicator is compared with a predetermined threshold associated with the tyre, and
- if the indicator is greater than the predetermined threshold associated with the tyre, the number of landings is incremented.

The electrical power consumption of a counting device implementing the method according to the invention is relatively low. Indeed, each measurement of the physical quantity can be carried out on a one-time basis and not in continuous mode, as is necessary in the method of the prior art, in order to determine the frequency. Thus, thanks to the method according to the invention, power is only consumed at the moment of the measurement and not between each measurement.

Advantageously, a sequence of measurements of the physical quantity is triggered when an initiation of a tyre movement is detected. The measurement of the quantity is thus limited solely to the intervals of time during which the tyre is moving. The energy consumption is therefore reduced. The measurement sequence is stopped when, subsequent to an initiation of movement of the tyre, no movement of the tyre is any longer detected.

Preferably, the indicator is a time variation of the physical quantity over a predetermined interval of time. Thus, a relevant indicator is used without necessarily measuring an absolute value of the physical quantity because steps that could be needed for calibration are obviated when the device implementing the method is reset. Lastly, it is of no consequence whether the physical quantity is sensitive to the climatic conditions or not.

According to an optional feature of the method, the physical quantity is measured at regular intervals of time. By choosing a sufficiently short interval, the exceeding of the threshold is detected relatively quickly. By choosing a sufficiently long interval, the energy consumption is reduced since the number of measurements made is reduced.

Preferably, the physical quantity is chosen from between the temperature and the pressure. Such physical quantities are substantially independent of the magnetic environment of the tyre. The method therefore allows a reliable measurement of the physical quantity to be made irrespective of the magnetic environment in contrast to a method in which a measurement of a magnetic field would be used for calculating the indicator.

Another subject of the invention is a device for counting the number of landings of an aircraft tyre, characterized in that it comprises:
- means for discontinuously measuring a physical quantity of the air contained inside of the tyre;
- means for determining an indicator relating to the physical quantity;
- means for comparing the indicator with a predetermined threshold associated with the tyre, and
- means for incrementing the number of landings.

The energy consumption of the device according to the invention is relatively low. If it is desired to avoid as far as possible the replacement of the power supply means, a battery with a capacity of 550 mA·h and weighing 8 g allows a lifetime of the device that can reach 12 years to be obtained. Thus, the same power supply means may be conserved during the entire lifetime of the structure, notably during the various retreadings, generally five, to which the structure of the tyre is subjected. If it is desired to favour reducing the weight of the device while at the same time keeping a lifetime limited to 2 years, the device allows the capacity of the battery to be reduced to 110 mA·h and hence the total mass of the device by around 20%.

Preferably, the device comprises means for detecting an initiation of movement of the tyre and means for activating the measurement means activatable by the detection means.

Other subjects of the invention are a valve, a tyre, an aircraft wheel and an aircraft, each of these subjects being characterized in that it comprises a device such as defined hereinabove.

BRIEF DESCRIPTION OF THE DRAWINGS

The invention will be better understood upon reading the description that follows, given solely by way of non-limiting example and presented with reference to the appended drawings in which:

FIG. 3 illustrates a curve of the variation, as a function of time, of the frequency of rotation of a tyre during a cycle comprising a takeoff and a landing and a curve of the variation, as a function of the time, of the temperature of the air contained inside of a tyre during this same cycle;

FIG. 4 illustrates a variation, as a function of time, of a trigger signal for the measurement of the temperature by the device in FIG. 2;

FIG. 5 illustrates sequences for measurements of the temperature by the device in FIG. 2;

FIG. 6 illustrates a curve of the variation, as a function of time, of an indicator relating to the variation of the temperature measured in FIG. 5.

DETAILED DESCRIPTION OF EMBODIMENTS OF THE INVENTION

Figure 1:
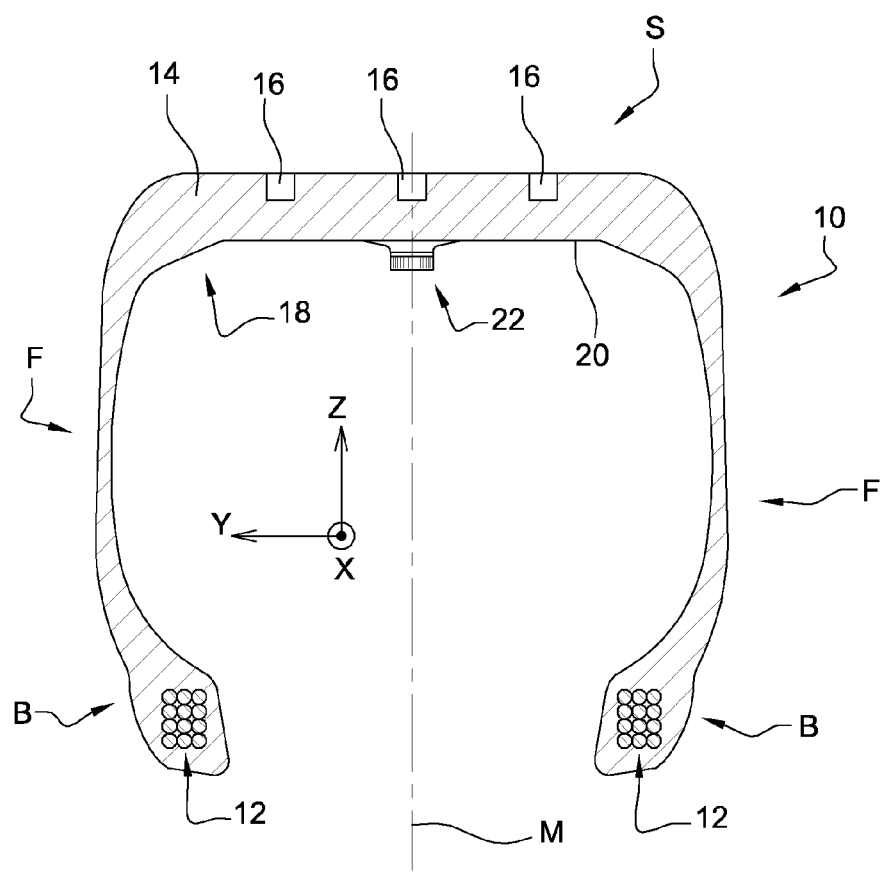
FIG. 1 is an axial cross-sectional view of a tyre according to the invention.

FIG. 1 shows a tyre according to the invention denoted by the general reference 10. The tyre 10 is designed to be mounted on an aircraft wheel. FIG. 1 shows mutually orthogonal axes X, Y, Z corresponding to the usual radial (Z), axial (Y) and circumferential (X) orientations of a tyre.

Conventionally, the tyre 10 comprises a crown S extended by two sides F and two inner beads B. Two steel wire cores 12 are buried in the inner beads B. The two steel wire cores 12 are arranged symmetrically with respect to a median radial plane M of the tyre. Each steel wire core 12 is of revolution around a reference axis. This reference axis, substantially parallel to the direction Y, is substantially coincident with an axis of revolution of the tyre. The crown S comprises a tread 14, equipped with sculpted features 16. The tyre 10 also comprises an internal layer of leak-tight rubber 18 running between the two annular steel wire cores 12 of the tyre 10 going through the crown S. The internal layer 18 has an external surface 20 in contact with the air contained inside of the tyre 10. The tyre 10 comprises a device 22 for counting the number N of landings of the tyre 10. The device 22 is attached to the external surface 20, for example by adhesive bonding.

According to one alternative embodiment, the device 22 can also be attached to a wheel valve.

Figure 2:
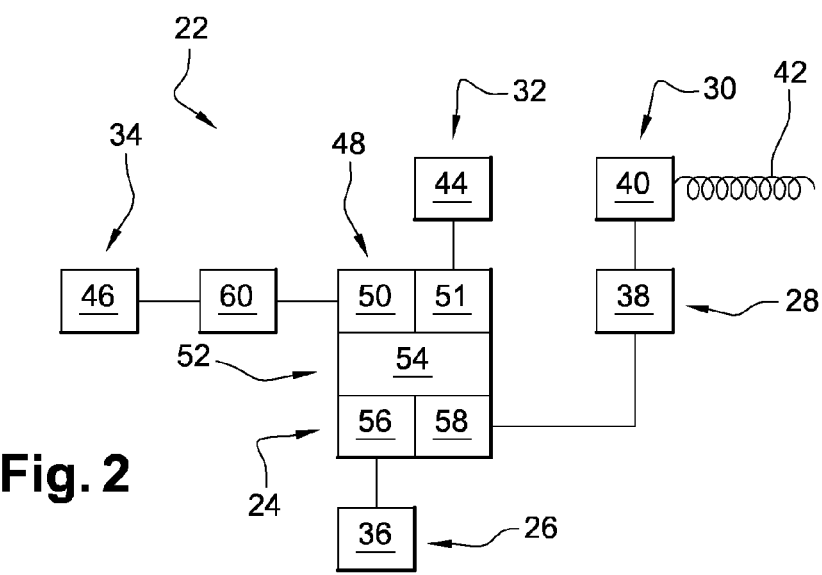
FIG. 2 is a basic functional diagram of a device according to the invention for the tyre in FIG. 1.

FIG. 2 shows a basic functional diagram of the device 22. The device 22 comprises a micro-controller 24 together with means 26 for supplying power to the device 22 and means 28 for storing data. The device 22 comprises means 30 for communicating data stored in the means 28 to the outside. The device 22 also comprises means 32 for detecting the initiation of movement of the tyre 10 and means 34 for discontinuous measurement of a physical quantity of the air contained inside of the tyre 10.

The power supply means 26 comprise a battery 36 with a capacity of 550 mA·h and weighing 8 g. The means for storing data 28 comprise a memory 38 of the E2PROM type. The communication means 30 comprise a transmitter/receiver 40 operating at 125 kHz and an antenna 42 capable of transmitting the data stored in the memory 38 to the outside in response to a read signal from a reader.

The detection means 32 comprise a sensor 44 of rotation of the tyre 10 and allow the initiation of the rotation of the tyre 10 to be detected. Such a sensor 44 is notably described in the patent application published under the number WO2004/110793.

The measurement means 34 allow the measurement of the temperature T of the air contained inside of the tyre. The means 34 comprise for example a thermocouple 46, a platinum probe or, alternatively, an integrated temperature sensor.

The micro-controller 24 comprises means 48 for counting the time comprising a clock 50 together with means 51 for activating the measurement means 34 activatable by a signal D from the detection means 32. The micro-controller 24 also comprises means 52 for determining an indicator I relating to the physical quantity, here the temperature T of the air contained inside of the tyre 10; in this case, these means are a computer 54. Furthermore, the micro-controller 24 comprises means 56 for comparing the indicator I with a predetermined threshold S associated with the tyre 10. Lastly, the micro-controller 24 comprises means 58 for incrementing the number N of landings connected to the means for storing data 28.

The means 34 comprise means 60 for synchronizing the thermocouple 46 with the clock 50 in order that each instantaneous measurement of the temperature T of the air contained inside of the tyre 10 is made at regular intervals of time.

The main steps of a method according to the invention will now be described with reference to FIGS. 3 to 6.

FIG. 3 shows a curve of variation, as a function of time, of the frequency F of rotation of a tyre during a cycle comprising a takeoff and a landing (continuous line curve) and a curve of variation, as a function of time, of the temperature of the air contained inside of a tyre during this same cycle (dashed curve).

The interval of time between the time $t_0$ and $t_1$ corresponds to a parking phase. The aircraft is immobile in a parking place. The frequency f is therefore zero and the temperature T constant and equal to the temperature of the ambient air.

The interval of time between the time $t_1$ and $t_4$ corresponds to a phase of rolling. Between the time $t_1$ and $t_2$, the aircraft leaves its parking place and accelerates until it reaches a constant speed corresponding to the frequency of rotation f2. As the rolling of the tyre on the runway heats up the latter, the temperature T progressively increases. Between the time $t_2$ and $t_3$, the aircraft moves at a constant speed over the taxiway to reach the takeoff strip. The temperature T continues to rise progressively. Between the time $t_3$ and $t_4$, the aircraft progressively decelerates in order to position itself at the end of the runway for takeoff. At the time $t_4$, it is immobile and ready for takeoff. The temperature T decreases subsequent to the stopping of the aircraft.

Between the time $t_4$ and $t_5$, the aircraft remains immobile at the end of the runway awaiting the order to take off which occurs at the time $t_5$. The temperature T continues to decrease until the time $t_5$.

The interval of time between the time $t_5$ and $t_6$ corresponds to a takeoff phase. The aircraft accelerates abruptly in order to reach its takeoff speed corresponding to a frequency of rotation f6. The temperature T also increases more rapidly.

The interval of time between the time $t_6$ and $t_8$ corresponds to a flight phase. Between the time $t_6$ and $t_7$, the rotation of the tyre quickly slows down to reach a stop at $t_7$. Owing to the thermal inertia of the air contained inside of the tyre, the temperature continues to increase over a part of the interval between $t_6$ and $t_7$. Between the time $t_7$ and $t_8$, the landing gear having been retracted, the tyre is immobile which corresponds to a frequency f of zero. The temperature T decreases owing to the immobility of the tyre, but also because of the very low temperature of the air surrounding the tyre.

The interval of time between the time $t_8$ and $t_9$ corresponds to a landing phase. The aircraft lands at the time $t_8$. Abruptly, the tyre accelerates to reach the landing speed of the aircraft at $t_9$ corresponding to the frequency of rotation f9. The temperature T also increases rapidly.

The interval of time between the time $t_9$ and $t_{10}$ corresponds to a phase of rolling. The aircraft progressively decelerates until it reaches its parking place where it stops. The frequency f is then zero at the time $t_{10}$. Owing to the thermal inertia of the air contained inside of the tyre, the temperature continues to increase over a part of the interval between $t_9$ and $t_{10}$ before decreasing following the decrease in the frequency of rotation of the tyre.

FIG. 4 shows a signal D for detecting the initiation of the movement of the tyre 10 emitted by the means 32. When the tyre 10 is in an immobile state in which its frequency of rotation is zero, the signal D takes the value 0. When the tyre 10 is moving, its frequency of rotation is non-zero and the signal D takes the value 1. Thus, the signal D takes the value 0 over the interval of $t_0$-$t_1$, $t_4$-$t_5$, $t_7$-$t_8$ and $t_{10}$-$t_1$ and takes the value 1 over the interval of time $t_1$-$t_4$, $t_5$-$t_7$ and $t_8$-$t_{10}$.

FIG. 5 shows time sequences of measurements S1, S2, S3 of the temperature T of the air contained inside of the tyre 10 according to the invention. Each sequence S1, S2, S3 of measurements is triggered when the initiation of a tyre 10 movement is detected, in other words when the signal for detecting the initiation of the movement takes the value 1. The sequence S1 starts at the time $t_1$ and it is interrupted at the time $t_4$. The sequence S2 starts at the time $t_5$ and it is interrupted at the time $t_7$. The sequence S3 starts at the time $t_8$ and it is interrupted at the time $t_{10}$. In each sequence S1, S2, S3, the temperature T of the air contained inside of the tyre is measured in discontinuous mode. In this case, the temperature T is measured at regular intervals of time, here every 10 seconds.

FIG. 6 shows the curve of variation of an indicator I relating to the temperature T as a function of time. The indicator I is a time variation of the temperature T over a predetermined interval of time $\Delta t$. The predetermined interval of time is here the interval of time separating two successive measurements of the temperature T, i.e. 10 seconds. Thus, the following calculation is performed every 10 seconds: $I(t+\Delta t)=(T(t+\Delta t)-T(t))/\Delta t$.

During each sequence S1, S2, S3, the indicator I relating to the temperature is determined over each predetermined interval of time $\Delta t$. Each calculated indicator I is compared with a predetermined threshold S associated with the tyre.

If the indicator I is greater than the predetermined threshold S, the number of landings N is incremented of 1. If the indicator I is lower than the predetermined threshold S, the number of landings N does not change. As long as the indicator I does not fall back below the predetermined threshold S, the number of landings N cannot be incremented. Thus, as illustrated in FIG. 6, during a cycle comprising a landing and a takeoff, the indicator I exceeds the predetermined threshold S a first time during the sequence S2 of measurements corresponding to the takeoff of the aircraft just after the time $t_5$ and falls back below the predetermined threshold S during this same sequence S2 just after the time $t_6$. Then, the indicator I exceeds the predetermined threshold S a second time during the sequence S3 of measurements corresponding to the landing of the aircraft just after the time $t_8$ and falls back below the predetermined threshold S during this same sequence S3 after the time $t_9$. Thus, during a cycle comprising a landing and a takeoff, the number N is incremented twice.

The invention is not limited to the embodiment previously described.

Thus, in another embodiment, the measured physical quantity of the air contained inside of the tyre is the pressure.

Among other advantages, the device according to the invention can be installed on a tyre comprising a device such as described in the application published under the number WO 2004/110793 by modifying the latter. The device according to the invention only uses the function for detecting the initiation of the movement of the tyre of the device of this prior art for triggering the measurement of the quantity. The device according to the invention does not use the function for continuous measurement of the time variations of the magnetic flux for determining the frequency of rotation of the tyre since the latter is too energy-hungry. Thus, the function for detecting the initiation of the movement of the tyre of the already existing device may be used in order to adapt the device according to the invention on tyres already in service. Thus, even if the magnetic environment of the device is perturbed by magnetic sources from non-natural origins, these magnetic sources are not sufficiently intense to interfere with the detection of the initiation of the movement of the tyre of a device of the prior art modified according to the invention. This detection allows the measurement of the physical quantity to be triggered, which measurement is not sensitive to any magnetic interference.

The invention claimed is:

1. A method for counting a number of landings of an aircraft tyre, the method comprising steps of:
   intermittently measuring, in a discontinuous mode at regular intervals of time during the measuring, a physical quantity of air contained inside the tyre, the measuring being performed using a controller and beginning a sequence of measurements of the physical quantity when an initiation of tyre movement is detected, and ending the sequence of measurements when no tyre movement is detected;
   determining at least one indicator relating to the physical quantity;
   comparing the at least one indicator with a predetermined threshold associated with the tyre;
   if the at least one indicator is determined to be greater than the predetermined threshold associated with the tyre, incrementing a stored number of landings of the tyre; and
   after the stored number of landings of the tyre has been incremented, preventing the stored number of landings of the tyre from being incremented again until the at least one indicator is determined to have fallen below the predetermined threshold.

2. The method according to claim 1, wherein the at least one indicator is a time variation of the physical quantity over a predetermined interval of time.

3. The method according to claim 1, wherein the physical quantity is temperature.

4. The method according to claim 2, wherein the physical quantity is temperature.

5. A device for counting a number of landings of an aircraft tyre, the device comprising:
   detection means for detecting an initiation of movement of the tyre;
   measurement means for discontinuously and intermittently measuring at regular intervals of time a physical quantity of air contained inside the tyre, the measuring means being controlled by a controller, wherein the controller controls the measurement means such that a sequence of measurements of the physical quantity begins when an initiation of tyre movement is detected by the detection means and ends when no tyre movement is detected by the detection means;
   determination means for determining an indicator relating to the physical quantity;
   comparison means for comparing the indicator with a predetermined threshold associated with the tyre; and
   incrementation means for incrementing a stored number of landings of the tyre, if the indicator is greater than the predetermined threshold,
   wherein, after the incrementation means increments the stored number of landings of the tyre, the controller prevents the stored number of landings of the tyre from being incremented again until the indicator is determined to have fallen below the predetermined threshold.

6. The device according to claim 5, wherein the device is incorporated in the aircraft tyre.

7. The device according to claim 5, wherein the device is incorporated in an aircraft wheel.

8. The device according to claim 6, wherein the aircraft tyre is incorporated in an aircraft.

9. The device according to claim 7, wherein the aircraft wheel is incorporated in an aircraft.

10. The device according to claim 5, wherein the device is incorporated in a valve.

11. A device for counting a number of landings of an aircraft tyre, the device comprising:
    a sensor that detects an initiation of movement of the tyre;
    a probe that discontinuously and intermittently measures at regular intervals of time a physical quantity of air contained inside the tyre; and
    a computer controller programmed to:
      activate the probe to perform measurements,
      determine an indicator relating to the physical quantity,
      compare the indicator with a predetermined threshold associated with the tyre, and,
      if the indicator is greater than the predetermined threshold, increment a stored number of landings of the tyre,
    wherein the controller activates the probe such that a sequence of measurements of the physical quantity begins when an initiation of tyre movement is detected by the sensor, and deactivates the probe such that the sequence of measurements ends when no tyre movement is detected by the sensor, and
    wherein, after the stored number of landings of the tyre has been incremented, the controller prevents the stored number of landings of the tyre from being incremented again until the indicator is determined to have fallen below the predetermined threshold.

12. The device according to claim 11, wherein the device is incorporated in the aircraft tyre.

* * * * *